April 8, 1969   E. E. HETTEEN   3,437,354
SNOWMOBILE TRANSPORTING APPARATUS
Filed Aug. 10, 1967   Sheet 1 of 2

INVENTOR.
EDGAR E. HETTEEN
BY Schroeder, Siegfried & Ryan
ATTORNEYS

April 8, 1969  E. E. HETTEEN  3,437,354
SNOWMOBILE TRANSPORTING APPARATUS
Filed Aug. 10, 1967  Sheet 2 of 2

INVENTOR.
EDGAR E. HETTEEN
BY Schroeder, Siegfried
& Ryan
ATTORNEYS

United States Patent Office 3,437,354
Patented Apr. 8, 1969

3,437,354
SNOWMOBILE TRANSPORTING APPARATUS
Edgar E. Hetteen, Rte. 5, Thief River Falls,
Minn. 56701
Filed Aug. 10, 1967, Ser. No. 659,629
Int. Cl. B60f 5/00; B22b 19/00; B62b 13/18
U.S. Cl. 280—415                                9 Claims

ABSTRACT OF THE DISCLOSURE

This disclosure is directed to a mechanism for towing a snowmobile by using an auxiliary set of wheels and load-supporting mechanism which is placed beneath the skis of the snowmobile and uses the springs of the snowmobile to provide the necessary suspension mechanism for the snowmobile. The mechanism is easily secured in place by having a communicating member secured to the skis and mating members on the load-supporting mechanism. A pair of stabilizing arms are secured beneath the snowmobile and the load-supporting mechanism to prevent rotating of the skis about the shaft supporting the wheels. The rear of the snowmobile is secured to the towing vehicle by a conventional ball and socket hitch.

---

This invention relates to the field of attachments for transporting loads and more particularly to a mechanism to be secured to a snowmobile for transporting the snowmobile.

The present practice of transporting a snowmobile from one location to another is to place the snowmobile on a small flat-bed trailer or upon a trailer which in many respects, resembles a boat trailer. One such device is that shown in United States Letters Patent No. 3,149,738. Trailers of the type described and shown therein have a particular disadvantage in attempting to load the vehicle on the trailer which quite often requires two people, one operating the snowmobile and the other lifting the front end of the skis to get the snowmobile into place. Additionally, the rear portion of the snowmobile must be secured to the trailer if used over any terrain which is somewhat uneven to prevent the snowmobile from becoming dislodged on the trailer. It becomes increasingly difficult to load the snowmobile when the snowmobile has a malfunction in its driving mechanism because it must then be pushed, or pulled onto the trailer frame.

The present invention may be placed under the skis of the snowmobile by a single operator in a minimum amount of time without any power being applied to the snowmobile and it may be disconnected from the transporting mechanism equally as easy. The single shaft and wheels along with the load-supporting mechanism may be easily removed from the snowmobile after transporting it to its place of use or storage and the mechanism placed in the trunk of an automobile for storage or transportation to another location. In other words, the transporting mechanism is extremely movable and compact in size for use with a snowmobile.

It is therefore a general object of this invention to provide improved means for transporting a snowmobile using its own suspension system.

It is a more specific object of this invention to provide a means for transporting a snowmobile having a load-supporting mechanism with wheels and to releasably secure the skis thereto at the front of the snowmobile and to secure the rear of the snowmobile to a towing vehicle by a hitch mechanism.

It is another object of this invention to provide a quick-fastening mechanism for securing the skis of a snowmobile to a transporting apparatus and securing the transporting apparatus against movement with respect to the snowmobile.

It is still another object of the present invention to provide a mechanism secured to the skis of a snowmobile which mates with another releasable mechanism secured to a load-supporting device for transporting a snowmobile.

These and other objects of this invention will become apparent from the attached description together with the drawings wherein.

Figure 1:
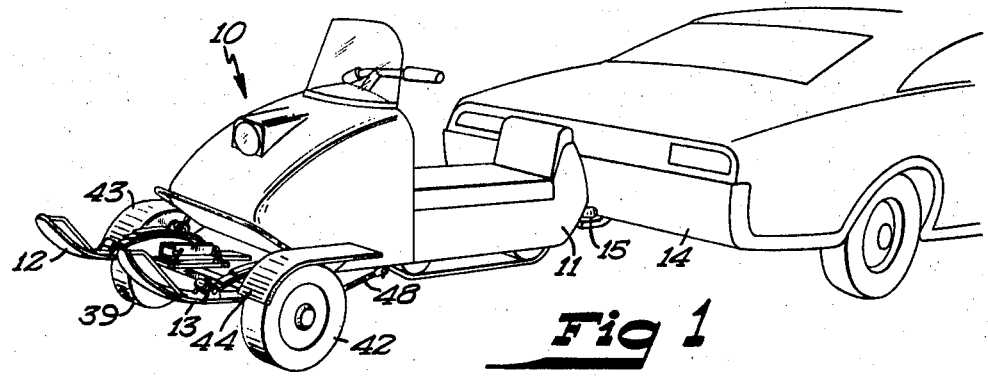
FIGURE 1 is a perspective view of a snowmobile attached to an automobile carrying out an embodiment of the invention.

FIGURE 1 discloses a snowmobile 10 which has a body portion 11 and a pair of skis 12 and 13. The rear portion of body 11 is secured to an automobile 14 through the use of a ball and socket hitch 15 that has a mating part secured to the automobile 14.

Figure 2:
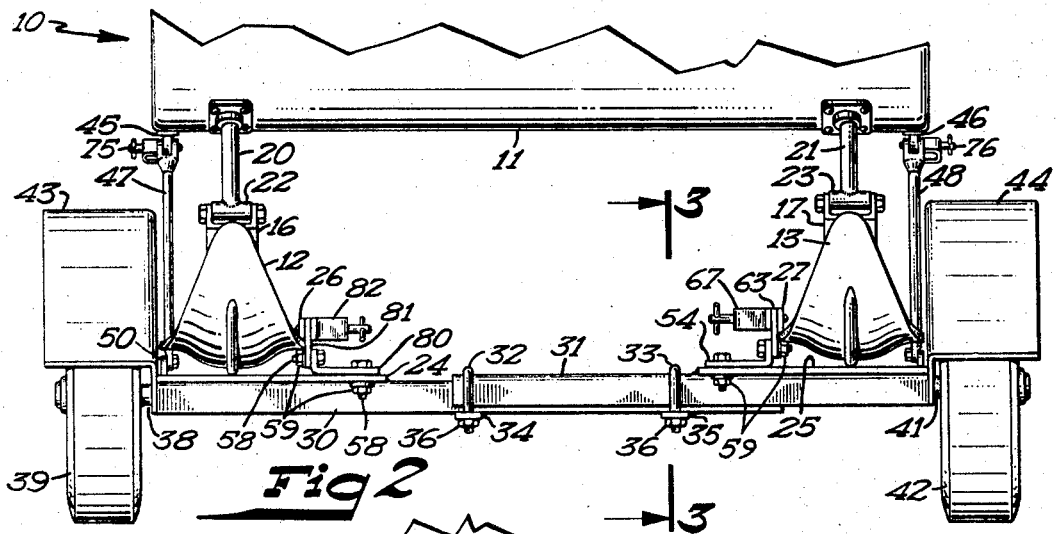
FIGURE 2 is an elevational end view of the invention showing the skis of the snowmobile secured to the load-supporting mechanism.

A more detailed view of a transporting apparatus is found in FIGURE 2 where it will be seen that ski 12 is suspended from a leaf-spring assembly 16 and ski 13 is suspended from a leaf-spring assembly 17. A pair of posts 20 and 21 are rotatably secured to the bottom of the front portion of the snowmobile 10 and have a pair of bearing members 22 and 23 respectively for receiving an appropriate pin connection for spring 16 and 17. In other words, what has been described is the conventional spring-suspension mechanism for supporting the snowmobile on a ski at each side of the forward portion of the snowmobile. Posts 20 and 21 are rotatable to turn the skis and guide the snowmobile. Skis 12 and 13 rest upon a pair of plates 24 and 25 respectively and have a pair of ski positioning members 26 and 27 secured thereto through suitable means such as machine screws or welding. Plates 24 and 25 are secured to a pair of U-shaped channel members 30 and 31 by suitable means such as welding. Channel member 30 is slidably received within channel member 31 so that they may be moved longitudinally with respect to each other, the two channel members being secured in place by a pair of U-bolts 32 and 33 which are threaded at the ends thereof and held in place by a pair of clamps 34 and 35 respectively, with a pair of nuts 36 for tightening the U-bolts and locking channel members 30 and 31 in place. At the end of channel member 30, is a shaft 38 which has a wheel 39 secured thereto for rotation about shaft 38. Shaft 38 is secured to the end of channel member 30 by suitable means such as welding. In a similar manner, a shaft 41 is secured in the end of channel member 31 and has a wheel 42 rotatably secured thereto. Secured to the end of channel 30 is a fender 43 which provides a protective covering for wheel 39 and another fender 44 provides a protective covering for wheel 42. Secured to the under portion of body 11, is a pair of lugs 45 and 46 which project downwardly, each ends at the upper portion thereof. The lower portions of with channel members 30 and 31. Lugs 45 and 46 may be secured to body 11 by any suitable means and receive a pair of arms 47 and 48 which have a pair of clevis-like ends of the upper portion thereof. The lower portions of arms 47 and 48 are pivotally secured to another pair of lugs 50 and 51 by suitable means such as bolts or pins. Lugs 50 and 51 are secured to the edge of plate members 24 and 25 respectively.

Figure 4:
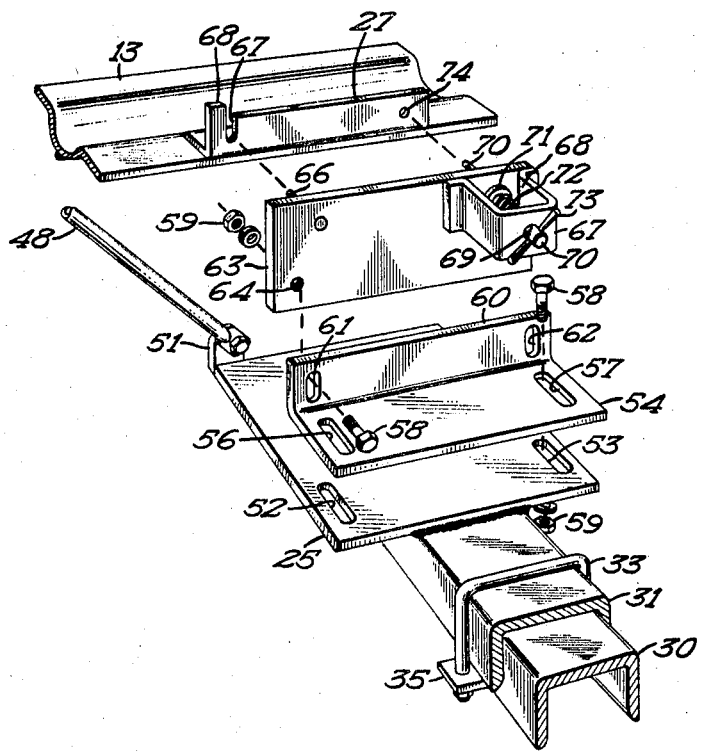
FIGURE 4 is an exploded perspective view of the ski-securing mechanism of the invention.

Referring now in particular to FIGURE 4, the ski-positioning members which are attached to plates 24 and 25 will be further described. Plate 25 has a pair of holes 52 and 53 formed therein on each side of channel member 31. As shown, the holes are elongated while in certain cases they may be merely drilled in plate 25. Plate 25 is shown welded to channel member 31 and has a right angle channel member 54 resting thereon. Channel member 54 also has a pair of slots 56 and 57 formed therein which mate with slots 52 and 53 to allow channel member 54 to be removed laterally with respect to ski 13. Channel member 54 is secured to plate 25 through suitable means such as bolts 58, and nuts 59. Right angle channel member 54 has a vertically extending portion 60 which also includes a pair of slots 61 and 62, it being observed that the slots extend vertically. Secured to upstanding portion 60 of channel member 54, is a bar member 63 which has a pair of holes or bores 64 and 65 which cooperate respectively with slots 61 and 62. The bar member 63 and upstanding portion 60 are secured by suitable means such as bolts 58 and nuts 59 described previously.

A pin 66 extends through bar member 63 and cooperates with ski-positioning member 27. Pin 66 engages a vertical slot 67 formed near the rear upper edge of member 27 and has one portion thereof abutting at a stop member 68 which is a lug portion at the end of member 27 which extends above the upper edge of the forwardly extending portion in front of slot 67. In other words, slot 67 communicates with the upper surface of the forwardly extending portion on member 27.

Located at the forward position of bar 63, is a spring-loaded pin mechanism 67. Spring-loaded pin mechanism 67 is formed from a U-shaped outer housing 68 which has a bore 69 extending through the closed end of the U-shaped bracket member, member 68 being secured to bar 63 by suitable means such as welding. Before welding the bracket member to bar 63, another pin 70 is extended through bore 69 and through a bore formed in bar 63. Pin 70 has a washer or bearing member 71 secured thereto through the use of welding or a shoulder to receive washer 71 and a spring 72 is compressed between washer 71 and the closed end of brackets 68. A finger-engaging member 73 passes through the end of pin 70 that extends beyond bracket 68 for engaging pin 70 and pulling it outwardly where it communicates with, and engages a bore 74 formed in ski-positioning member 27.

Figure 3:
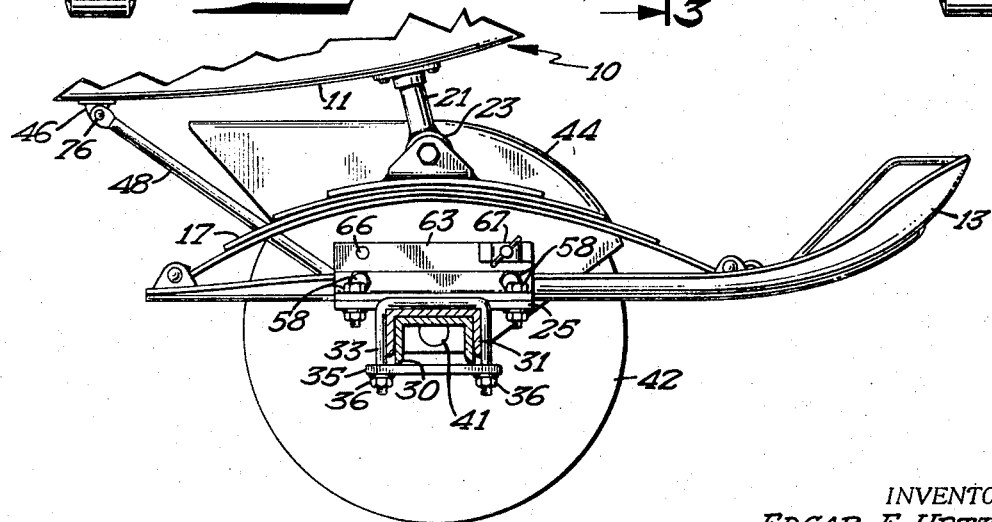
FIGURE 3 is a partial elevational view of the ski-securing mechanism taken along lines 3—3 of FIGURE 2.

The relationship of the ski-positioning members are also shown in FIGURES 3 and 4 which show the relationship of the snowmobile to the securing mechanism. In that respect, it will also be seen that another pair of releasable pin mechanisms 75 and 76 are secured to the outer portion of arms 47 and 48 respectively to allow is quick releasable connection to lugs 45 and 46 respectively. It will, of course, be understood that the spring-loaded pin mechanisms are the same or very similar to that of pin mechanism 67 just described previously.

The mechanism shown in FIGURE 4 is also used on the opposite side of the transporting apparatus as found in FIGURE 2 where a right angle channel member 80 is secured to plate 24 and a bar member 81 is secured to channel member 80 by suitable means such as bolts 58 and nuts 59 as described previously. The bar member 81 co-operates with ski-positioning member 26 and also contains a spring-loaded pin assembly 82 and another pin (not shown) which corresponds to pin 66.

Figure 5:
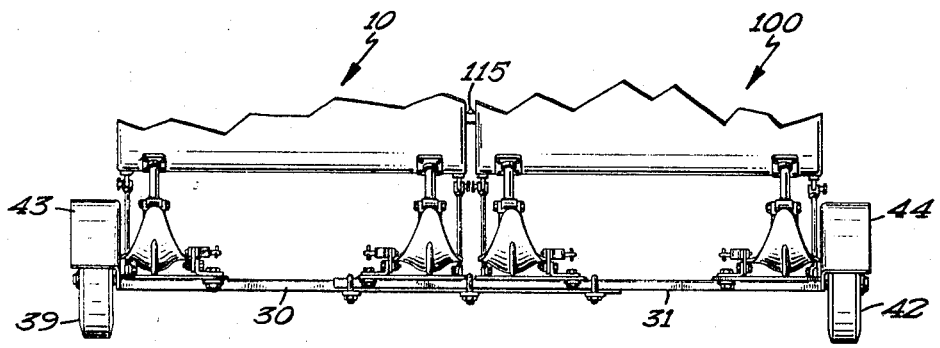
FIGURE 5 is an elevational end view of the invention showing the skis of two snowmobiles secured to the load-supporting mechanism for transporting two snowmobiles at one time.

FIGURE 5 shows a transporting mechanism in which channel member 30 and channel member 31 are of sufficient length to allow a pair of snowmobiles 10 and 100 to be placed side-by-side and held in place by the appropriate mechanism described previously. A hitch member 115 is releasably secured to snowmobiles 10 and 100 at the rear portions thereof so that both snowmobiles may be supported at the rear, and connected to the towing vehicle.

In positioning the transporting apparatus on the skis, the wheels are rolled to the front position of the skis and one of the skis is lifted at the front by the operator causing the pins such as pin 66 to ride on the upper portion of ski-positioning members 26 and 27 and pins 70 of pin mechanisms 67 and 82 to ride beneath the bottom portion of the skis. The transporting mechanism is pushed rearwardly until pins such as pin 66 drop into the slots such as slot 67 upon striking the back stop or stop member 68. The operator then pulls pins 70 of pin mechanisms 67 and 82 to allow the weight of the snowmobile and skis to snap the ski down on top of plates 24 and 25 and allow pins 70 to engage the holes such as hole 74. Stabilizer arms 47 and 48 are then raised into place and the pins passed through the holes formed in lugs 45 and 46.

In removing the transporting mechanism, arms 47 and 48 are disconnected from lugs 45 and 46 and each of the skis are individually lifted while the pins of spring-loaded pin mechanisms 67 and 82 are withdrawn allowing the axle and wheel to be drawn forwardly at which point the weight of the skis and snowmobile acting upon plates 24 and 25 on the mechanism are driven forwardly since the skis are free to rotate about the pivot points of shackles 22 and 23 and the transporting apparatus is merely withdrawn and the skis dropped to the ground.

It will thus be seen that an improved apparatus for transporting a snowmobile has been shown and described and the device is compact and easily operated by a single operator. It should also be kept in mind that because the snowmobile is open underneath its body when the apparatus is secured to a vehicle, the engine may be operated and the apparatus will be easy to service. When the transporting mechanism is not being operated, it may be readily stored in the towing vehicle or in some compact area.

It should also be recognized that the mechanism which is generally connected to plates 24 and 25 may be placed on skis 12 and 13 and ski-positioning members 26 and 27 may be placed on plates 24 and 25. Furthermore, it may be desirable to form the shaft and loading bearing mechanism so that at least one wheel or a pair of wheels may be placed between the skis rather than at the outside to support the snowmobile mechanism.

What is claimed is:

1. A transporting apparatus for use with a snowmobile having a pair of spring-suspended skis at the front thereof comprising:
    (a) ski-supporting means including an axle having sufficient length to be disposed transversely beneath the skis of such snowmobile and support a pair of wheels for rotation at the ends thereof beyond the outside of the skis, said ski-supporting means including plate means constructed and arranged to be secured to said axle in a position to receive the skis of such snowmobile;
    (b) a first pair of ski-positioning members adapted to communicate with a pair of cooperating members;
    (c) a second pair of ski-positioning members cooperating with said first pair of ski-positioning members to secure the skis against movement with respect to said ski-supporting means at a predetermined position thereon, one of said first and second pair of ski-positioning members being secured to said plate means and the other being secured to the edges of the skis of such snowmobile and disposed substantially midway between the spring-suspension points of the skis;
    (d) and a stabilizing mechanism constructed and arranged to engage such snowmobile rearwardly of its skis and engage said ski-supporting means for stabilizing said axle against longitudinal movement with respect to such snowmobile.

2. The invention as set forth in claim 1 including:
    (e) a hitch member independent of said ski-supporting means and secured to the rear body portion of such snowmobile, said hitch member adapted to releasably engage a cooperating and mating member.

3. The invention as set forth in claim 1 wherein said first pair of ski-positioning members is secured to said plate means and includes:

(f) a pair of vertically extending guide elements oriented in substantially parallel relationship and disposed longitudinally in confronting edge relationship with the skis of such snowmobile when resting on said plate means.

4. The invention as set forth in claim 3 wherein said first pair of ski-positioning members include:

(g) a pair of pins transversely secured to each of said pair of vertically extending guide elements and disposed at a forward and rearward longitudinal position from each other with respect to the skis of such snowmobile, said pins extending into cooperative engagement with said second pair of ski-positioning members, the pin nearest the front of the skis being spring biased into an extended position.

5. The invention as set forth in claim 4 wherein said second pair of ski-positioning members include:

(h) a pair of vertically extending guide elements having a longitudinal upper surface and stop member at the portion nearest the rear of the skis cooperatively engaging said rearwardly disposed pin and having a bore formed therein at the portion nearest the front of the skis cooperatively engaging said forwardly disposed pin.

6. The invention as set forth in claim 3 wherein each of said pair of vertically extending guide elements include:

(i) a channel member having an upstanding portion releasably and movably secured to said plate means for lateral movement with respect to the skis of such snowmobile when resting on said plate means;

(j) a bar member releasably and movably secured to said upstanding portion of said channel member for vertical movement with respect to the skis of such snowmobile when resting on said plate means;

(k) a plurality of releasable fastening means securing said channel member to said plate means and to said bar member thereby providing means for aligning said vertically extending guide elements with respect to said pair of ski-positioning members secured to said skis.

7. A transporting apparatus for use with a pair of snowmobiles, each of which has a pair of spring-suspended skis at the front thereof, said towing apparatus comprising:

(a) ski-supporting means including an axle having sufficient length to be disposed transversely beneath the skis of such snowmobiles and support a pair of wheels for rotation at the ends thereof beyond the outer skis of such pair of snowmobiles, said ski-supporting means including plate means constructed and arranged to be secured to said axle in a position to receive the skis of such pair of snowmobiles;

(b) a first plurality of ski-positioning members adapted to communicate with a plurality of cooperating members;

(c) a second plurality of ski-positioning members cooperating with said first plurality of ski-positioning members to secure the skis against movement with respect to said ski-supporting means at a predetermined position thereon, one of said first and second plurality of ski-positioning members being secured to said plate means and the other being secured to the edges of the skis of such snowmobile and disposed substantially midway between the spring-suspension points of the skis;

(d) a stabilizing mechanism constructed and arranged to engage such pair of snowmobiles rearwardly of their skis and engage said ski-supporting means for stabilizing said axle against longitudinal movement with respect to such pair of snowmobiles;

(e) and a hitch member independent of said ski-supporting means and secured to the rear body portion of such pair of snowmobiles, said hitch member adapted to releasably engage a cooperating and mating member.

8. A snowmobile transporting apparatus comprising:

(a) a snowmobile having a body and a pair of spring-supported skis at the front thereof;

(b) ski-supporting means including an axle having sufficient length to be disposed transversely beneath said skis and support at least one wheel for rotation, said ski-supporting means including plate means constructed and arranged to be secured to said axle in a position to receive said skis;

(c) a first pair of ski-positioning members adapted to communicate with a pair of cooperating members;

(d) a second pair of ski-positioning members cooperating with said first pair of ski-positioning members to secure said skis against movement with respect to said ski-supporting means at a predetermined position thereon, one of said first and second pair of ski-positioning members being secured to said plate means and the other being secured to the edges of said skis and disposed substantially midway between the spring-suspension points of said skis;

(e) a stabilizing mechanism constructed and arranged to engage said snowmobile body rearwardly of said skis and engage said ski-supporting means for stabilizing said axle against longitudinal movement with respect to said snowmobile;

(f) and a hitch member independent of said ski-supporting means and secured to the rear portion of said snowmobile body, said hitch member adapted to releasably engage a cooperating and mating member of a towing vehicle.

9. The invention as set forth in claim 8 wherein:

(g) said first pair of ski-positioning members are secured to said plate means adjacent the inside edges of said skis and include a pair of pins extending transversely for cooperative engagement with a pair of communicating recesses, at least one of said pair of pins being spring biased into an extended position;

(h) and said second pair of ski-positioning members are secured to the inside edges of said skis and include said pair of communicating recesses to slidably secure said ski-supporting means to said skis.

References Cited

UNITED STATES PATENTS

| | | | |
|---|---|---|---|
| 1,401,085 | 12/1921 | Kilmer | 280—8 |
| 1,866,115 | 7/1932 | Larson | 280—8 |
| 2,157,461 | 5/1939 | Robinson | 280—8 |
| 2,647,759 | 8/1953 | Moffitt | 280—8 |
| 3,149,738 | 9/1964 | Bombardier | 280—400 X |

LEO FRIAGLIA, *Primary Examiner.*

U.S. Cl. X.R.

280—8, 47.15, 400.